United States Patent
Nakamura et al.

(10) Patent No.: US 12,313,493 B2
(45) Date of Patent: May 27, 2025

(54) MODE FIELD DIAMETER MEASURING METHOD AND MODE FIELD DIAMETER MEASURING DEVICE

(71) Applicant: NIPPON TELEGRAPH AND TELEPHONE CORPORATION, Tokyo (JP)

(72) Inventors: Atsushi Nakamura, Musashino (JP); Yusuke Koshikiya, Musashino (JP); Nazuki Honda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/285,709

(22) PCT Filed: Apr. 14, 2021

(86) PCT No.: PCT/JP2021/015415
§ 371 (c)(1),
(2) Date: Oct. 5, 2023

(87) PCT Pub. No.: WO2022/219740
PCT Pub. Date: Oct. 20, 2022

(65) Prior Publication Data
US 2024/0183746 A1    Jun. 6, 2024

(51) Int. Cl.
*G01M 11/00*    (2006.01)
(52) U.S. Cl.
CPC .............................. *G01M 11/332* (2013.01)

(58) Field of Classification Search
CPC .. G01M 11/332; G01M 11/02; G01M 11/338; G01M 11/3145; G01M 11/335;
(Continued)

(56) References Cited

U.S. PATENT DOCUMENTS 8,860,934 B2 * 10/2014 Yablon .................... G01N 21/63
356/73.1
8,867,028 B2 * 10/2014 Yablon ................. G01M 11/338
356/73.1
(Continued)

OTHER PUBLICATIONS

Nishimura et al "Method of Measuring a Spot Size of a Single-mode Fiber", May 15, 1985, EP 0141251 A1 (Year: 1985).*
(Continued)

*Primary Examiner* — Sang H Nguyen
(74) *Attorney, Agent, or Firm* — Harness, Dickey & Pierce, P.L.C.

(57) ABSTRACT

The present invention has an object to provide a mode field diameter measurement method enabling easily measuring a mode field diameter in an optical fiber, which is capable of propagating a fundamental mode (LP01 mode) and a first higher order mode (LP11 mode), without using a mode multiplexer, and a measurement device of the mode field diameter measurement method.
In a mode field diameter measurement method according to the present invention, an intensity ratio between an LP01 mode and an LP11 mode output from an optical fiber to be tested is changed, a mode field diameter is measured by a variable aperture (VA) method for each intensity ratio, and each mode field diameter is calculated.

2 Claims, 6 Drawing Sheets

(58) Field of Classification Search
CPC ...... G01M 11/33; G01M 11/37; G01N 21/63; G01N 21/412; G02B 6/0006; G02B 6/02042; G02B 6/4215; G02B 6/0008
See application file for complete search history.

(56) References Cited

U.S. PATENT DOCUMENTS

| | | | |
|---|---|---|---|
| 9,513,189 B2* | 12/2016 | Jiang | G01M 11/33 |
| 11,906,387 B2* | 2/2024 | Nakamura | G01M 11/02 |
| 2002/0178757 A1* | 12/2002 | Chinn | G01M 11/334 |
| | | | 65/378 |
| 2009/0262337 A1* | 10/2009 | Nicholson | G01M 11/331 |
| | | | 356/73.1 |
| 2018/0100782 A1* | 4/2018 | Hayashi | G01M 11/33 |
| 2019/0011623 A1* | 1/2019 | Hayashi | G02B 6/0006 |

OTHER PUBLICATIONS

A. Nakamura et al., "Mode field diameter definitions for few-mode fibers based on spot size of higher-order Gaussian mode," IEEE Photonics Journal, vol. 12, No. 2, 7200609, 2020.

* cited by examiner

MODE FIELD DIAMETER MEASURING METHOD AND MODE FIELD DIAMETER MEASURING DEVICE

CROSS-REFERENCE TO RELATED APPLICATIONS

This application is a 371 U.S. National Phase of International Application No. PCT/JP2021/015415, filed on Apr. 14, 2021. The entire disclosure of the above application is incorporated herein by reference.

TECHNICAL FIELD

The present disclosure relates to a mode field diameter measurement method for measuring a mode field diameter of a multimode fiber and a measurement device thereof.

BACKGROUND ART

With an increase in large-capacity content typified by moving images and games and the spread of smartphones, traffic volume in an optical fiber network is increasing year by year. On the other hand, the limit of the transmission capacity of the single-mode fiber currently used as a transmission medium is close. As one technology for coping with future traffic increase, mode multiplex transmission using a multimode fiber has attracted attention. In the mode multiplex transmission system, since a plurality of waveguide modes are used as transmission channels, it is important to grasp the transmission characteristics of each mode.

The transmission characteristics of the optical fiber are closely related to the electric field distribution of the waveguide mode. The mode field diameter is a parameter representing the spread of the electric field, and allows a connection loss, wavelength dispersion, a backscattered light capturing rate, and the like to be estimated. Thus, the mode field diameter is one of the important parameters for grasping the transmission characteristics of the optical fiber. Non Patent Literature 1 discloses a method for acquiring a mode field diameter of a waveguide mode incident as test light by making the test light, to be measured, enter a multimode fiber in a waveguide mode and measuring light output from the multimode fiber.

CITATION LIST

Non Patent Literature

Non Patent Literature 1: A. Nakamura et al., "Mode field diameter definitions for few-mode fibers based on spot size of higher-order Gaussian mode," IEEE Photonics Journal, vol. 12, no. 2, 7200609, 2020.

SUMMARY OF INVENTION

Technical Problem

However, in the method of Non Patent Literature 1, it is necessary to prepare a mode multiplexer or the like for causing test light to enter a multimode fiber in a waveguide mode to be measured, and there is a problem in measurement easiness.

The present invention has been made in view of the above circumstances, and an object thereof is to provide a mode field diameter measurement method enabling easily measuring a mode field diameter in an optical fiber, which is capable of propagating a fundamental mode (LP01 mode) and a first higher order mode (LP11 mode), without using a mode multiplexer, and to provide a measurement device of the mode field diameter measurement method.

Solution to Problem

In order to achieve the above object, in a mode field diameter measurement method according to the present invention, intensity ratios between an LP01 mode and an LP11 mode output from an optical fiber to be tested are varied, a mode field diameter is measured by a variable aperture (VA) method for each of the intensity ratios, and each mode field diameter is calculated.

Specifically, a first mode field diameter measurement method according to the present invention includes:
exciting an LP01 mode and an LP11 mode as test light to an optical fiber to be tested;
measuring light intensity output from the optical fiber to be tested while changing an aperture angle of a variable aperture;
acquiring an electric field spread value by using an integral value of a value related to the light intensity when the aperture angle is changed from zero to a maximum;
changing an intensity ratio between the LP01 mode and the LP11 mode output from the optical fiber to be tested and acquiring a plurality of the electric field spread value to acquire a relationship between the electric field spread value and the intensity ratio;
acquiring intensity ratio dependency of an electric field spread calculated value calculated from a mode field diameter of the LP01 mode, a wavelength of the test light, and the intensity ratio and the electric field spread calculated value has a mode field diameter of the LP11 mode as a variable, by setting the electric field spread value in a case where light output from the optical fiber to be tested is only the LP01 mode as the mode field diameter of the LP01 mode; and
finding the mode field diameter of the LP11 mode in which a square error between intensity ratio dependency of the electric field spread value and the intensity ratio dependency of the electric field spread calculated value is minimum.

A first mode field diameter measurement device that implements the first mode field diameter measurement method is a mode field diameter measurement device including: an exciter that excites an LP01 mode and an LP11 mode as test light to an optical fiber to be tested; a light intensity measurement unit that measures light intensity output from the optical fiber to be tested while changing an aperture angle of a variable aperture; a mode filter that changes an intensity ratio between the LP01 mode and the LP11 mode output from the optical fiber to be tested; and an arithmetic unit to which the light intensity measured by the light intensity measurement unit is input,
in which the arithmetic unit
acquires an electric field spread value by using an integral value of a value related to the light intensity when the aperture angle is changed from zero to a maximum,
acquires a plurality of the electric field spread value having different intensity ratios of the LP01 mode and the LP11 mode output from the optical fiber to be tested and acquires intensity ratio dependency of the electric field spread value,
acquires an electric field spread calculated value which is calculated from a mode field diameter of the LP01 mode, a wavelength of the test light, and the intensity ratio and the electric field spread calculated value has a mode field diameter of the LP11 mode as a variable, by setting the electric field spread value in a case where light output from the optical fiber to be tested is only the LP01 mode as the mode field diameter of the LP01 mode, and finds the mode field diameter of the LP11 mode in which a square error between intensity ratio dependency of the electric field spread value and intensity ratio dependency of the electric field spread calculated value with respect to the intensity ratio is minimum.

On the other hand, a second mode field diameter measurement method according to the present invention includes:

exciting an LP01 mode as test light to an optical fiber to be tested;

measuring light intensity of only the LP01 mode output from the optical fiber to be tested while changing an aperture angle of a variable aperture;

exciting the LP01 mode and an LP11 mode as test light to the optical fiber to be tested;

measuring light intensity in which the LP01 mode and the LP11 mode output from the optical fiber to be tested are mixed while changing the aperture angle of the variable aperture;

subtracting the light intensity of only the LP01 mode from the light intensity in which the LP01 mode and the LP11 mode are mixed for each of the aperture angle, and calculating light intensity of the LP11 mode for each of the aperture angle; and acquiring an electric field spread value by using an integral value of a value related to the light intensity of the LP11 mode when the aperture angle is changed from zero to a maximum, and setting the electric field spread value as a mode field diameter of the LP11 mode.

A second mode field diameter measurement device that implements the second mode field diameter measurement method is a mode field diameter measurement device including: an exciter that excites an LP01 mode and an LP11 mode as test light to an optical fiber to be tested; a light intensity measurement unit that measures light intensity output from the optical fiber to be tested while changing an aperture angle of a variable aperture; a mode filter that changes an intensity ratio between the LP01 mode and the LP11 mode output from the optical fiber to be tested; and an arithmetic unit to which the light intensity measured by the light intensity measurement unit is input, in which the arithmetic unit excites the LP01 mode as the test light to the optical fiber to be tested, and acquires an aperture angle dependency of light intensity of only the LP01 mode output from the optical fiber to be tested, the light intensity being measured while changing the aperture angle of the variable aperture;

excites the LP01 mode and the LP11 mode as the test light to the optical fiber to be tested, and acquires the aperture angle dependency of the light intensity in which the LP01 mode and the LP11 mode output from the optical fiber to be tested are mixed, the light intensity being measured while changing the aperture angle of the variable aperture;

subtracts the light intensity of only the LP01 mode from the light intensity in which the LP01 mode and the LP11 mode are mixed for each of the aperture angle, and calculates light intensity of the LP11 mode for each of the aperture angle; and acquires an electric field spread value by using an integral value of a value related to light intensity of the LP11 mode when the aperture angle is changed from zero to a maximum, and sets the electric field spread value as a mode field diameter of the LP11 mode.

In the mode field diameter measurement method and the measurement device according to the present invention, it is not necessary to excite only the first higher order mode (LP11 mode) to the optical fiber to be tested, and thus a mode multiplexer is unnecessary. Accordingly, the present invention can provide a mode field diameter measurement method enabling easily measuring a mode field diameter in an optical fiber, which is capable of propagating a fundamental mode (LP01 mode) and a first higher order mode (LP11 mode), without using a mode multiplexer, and can provide a measurement device of the mode field diameter measurement method.

Advantageous Effects of Invention

The present invention can provide a mode field diameter measurement method enabling easily measuring a mode field diameter in an optical fiber, which is capable of propagating a fundamental mode (LP01 mode) and a first higher order mode (LP11 mode), without using a mode multiplexer, and can provide a measurement device of the mode field diameter measurement method.

DESCRIPTION OF EMBODIMENTS

Embodiments of the present invention will be described with reference to the accompanying drawings. The embodiment described below is an example of the present invention, and the present invention is not limited to the following embodiment. Note that components having the same reference signs in the present specification and the drawings indicate the same components.

First Embodiment

Figure 1:
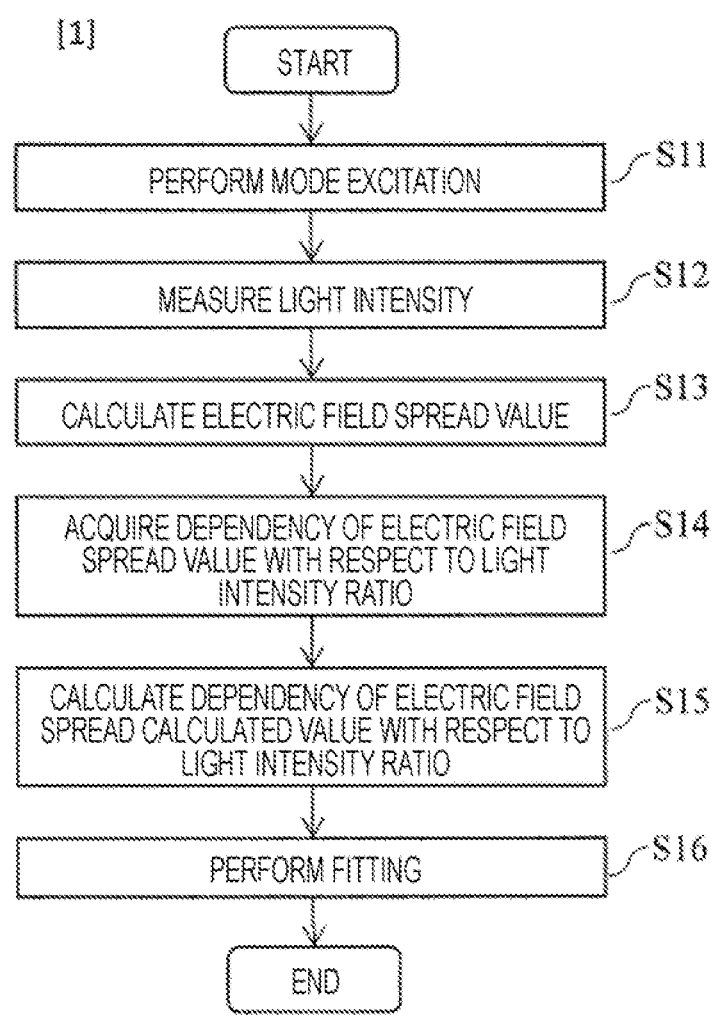
FIG. 1 is a diagram for explaining a first mode field diameter measurement method according to the present invention.

FIG. 1 is a process diagram for explaining a first mode field diameter measurement method.

This mode field diameter measurement method is a mode field diameter measurement method for measuring a mode field diameter of an optical fiber to be tested, which is capable of propagating LP01 mode and LP11 mode, by a variable aperture (VA) method.

A mode field diameter measurement method includes:

exciting an LP01 mode and an LP11 mode as test light to an optical fiber to be tested (step S11);

measuring light intensity output from the optical fiber to be tested while changing an aperture angle of a variable aperture (step S12);

acquiring an electric field spread value by using an integral value of a value related to the light intensity when the aperture angle is changed from zero to a maximum (step S13);

changing an intensity ratio between the LP01 mode and the LP11 mode output from the optical fiber to be tested (steps S12 and S13 are repeated) and acquiring a plurality of the electric field spread value to acquire a relationship between the electric field spread value and the intensity ratio (step S14);

acquiring intensity ratio dependency of an electric field spread calculated value calculated from a mode field diameter of the LP01 mode, a wavelength of the test light, and the intensity ratio and the electric field spread calculated value has a mode field diameter of the LP11 mode as a variable, by setting the electric field spread value in a case where light output from the optical fiber to be tested is only the LP01 mode as the mode field diameter of the LP01 mode (step S15); and finding the mode field diameter of the LP11 mode in which a square error between intensity ratio dependency of the electric field spread value and the intensity ratio dependency of the electric field spread calculated value is minimum (step S16).

Details will be described below.

Step S11

This step is a test light excitation procedure of exciting the LP01 mode and the LP11 mode to the optical fiber to be tested.

Step S12

This step is a light intensity measurement procedure of measuring light intensity of output light from the other end passing through an aperture while changing an aperture angle with respect to a central axis of the other end of the aperture installed so that a center is on the central axis of the other end of the optical fiber to be tested.

Step S13

This step is an electric field spread value calculation procedure of calculating an electric field spread value using the dependence of the light intensity measured in step S12 on the aperture angle and Equation (1) described below. The "an integral value of a value related to the light intensity when the aperture angle is changed from zero to a maximum" means the integral included in Equation (1).

[Math. 1]

$$D(k) = \frac{\lambda}{\pi}\left[\frac{1}{2}\int_0^{\theta_{max}}\left(1 - \frac{P(\theta, k)}{P(\theta_{max}, k)}\right)\sin(2\theta)d\theta\right]^{-\frac{1}{2}} \quad (1)$$

In the equation, $\lambda$ is the wavelength of the test light, k is the ratio of the light intensity of the LP11 mode to the light intensity of the LP01 mode included in the test light, $D(k)$ is the electric field spread value, $\theta$ is the aperture angle of the variable aperture 14 from the central axis of the optical fiber to be tested 10, $P(\theta, k)$ is the light intensity where the aperture angle of the variable aperture 14 is $\theta$, and $\theta_{max}$ is the maximum aperture angle.

Step S14

This step is an electric field spread value change acquisition procedure of attenuating the light intensity of the LP11 mode, excited to the optical fiber to be tested in step S11, by the mode filter, changing the ratio of the light intensities of the LP01 mode and the LP11 mode included in the output light, from the other end of the optical fiber to be tested, to repeat steps S12 and S13, and acquiring a change in the electric field spread value with respect to the ratio k between the light intensities of the LP01 mode and the LP11 mode. By performing this step, the graph of FIG. 2 (light intensity ratio dependency of electric field spread value) is acquired.

Step S15

Figure 2:
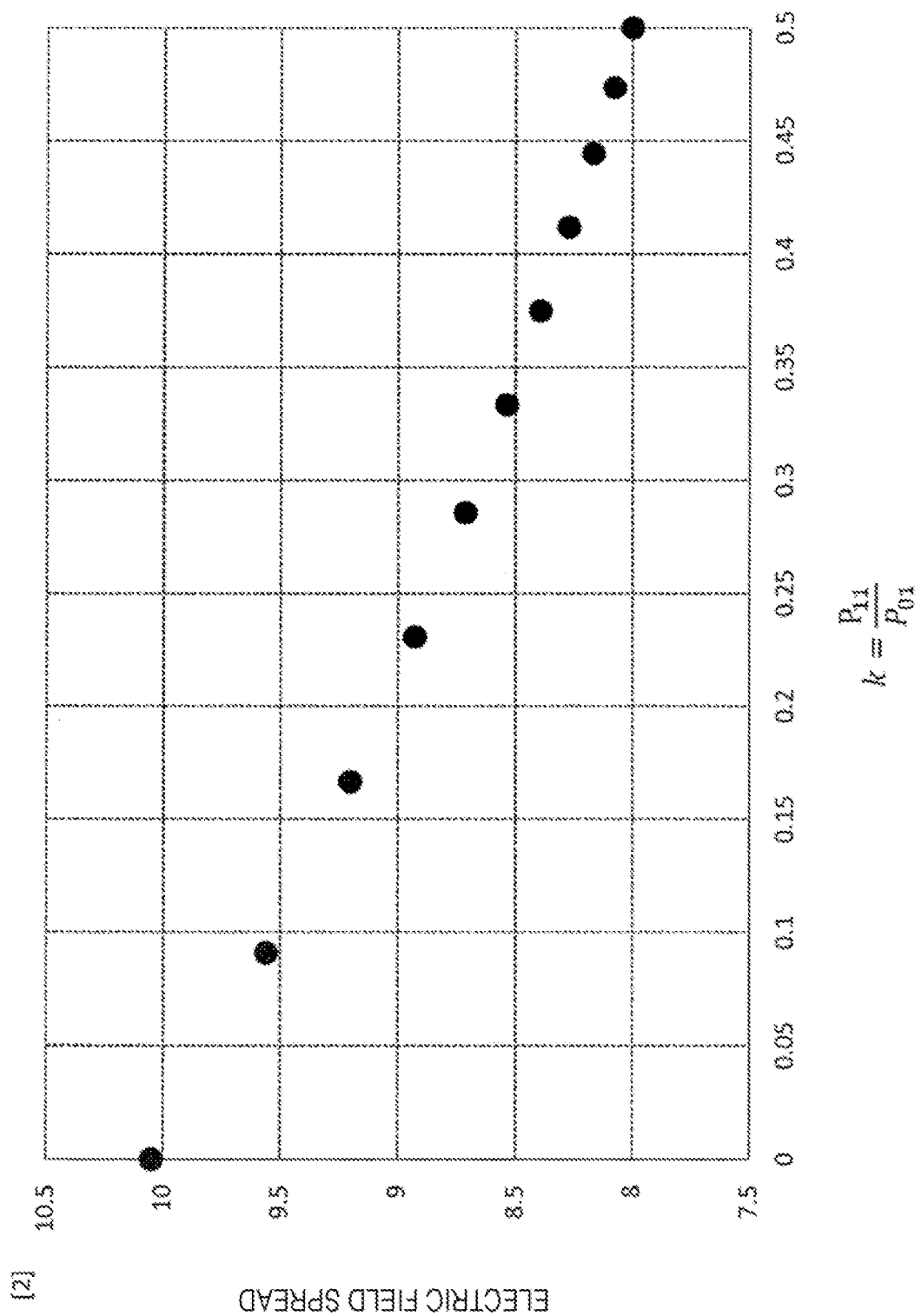
FIG. 2 is a diagram for explaining light intensity ratio dependency of an electric field spread value acquired by the first mode field diameter measurement method according to the present invention. The horizontal axis represents a light intensity ratio k, and the vertical axis represents an electric field spread value.

In the graph of FIG. 2, an electric field spread value when the light intensity ratio k=0 (only the LP01 mode is excited) is defined as a mode field diameter $w_{01}$ of the LP01 mode. A calculated value (electric field spread calculated value) of the electric field spread value is calculated using the mode field diameter $w_{01}$, the wavelength of the test light, and Equations (2) and (6) to (9) described later. The light intensity ratio k is changed to calculate the electric field spread calculated value, thereby obtaining the light intensity ratio dependency of the electric field spread calculated value. The light intensity ratio dependency of the electric field spread calculated value varies depending on a mode field diameter $w_{11}$ of the LP11 mode (the mode field diameter $w_{11}$ is a parameter).

Step S16

Figure 3:
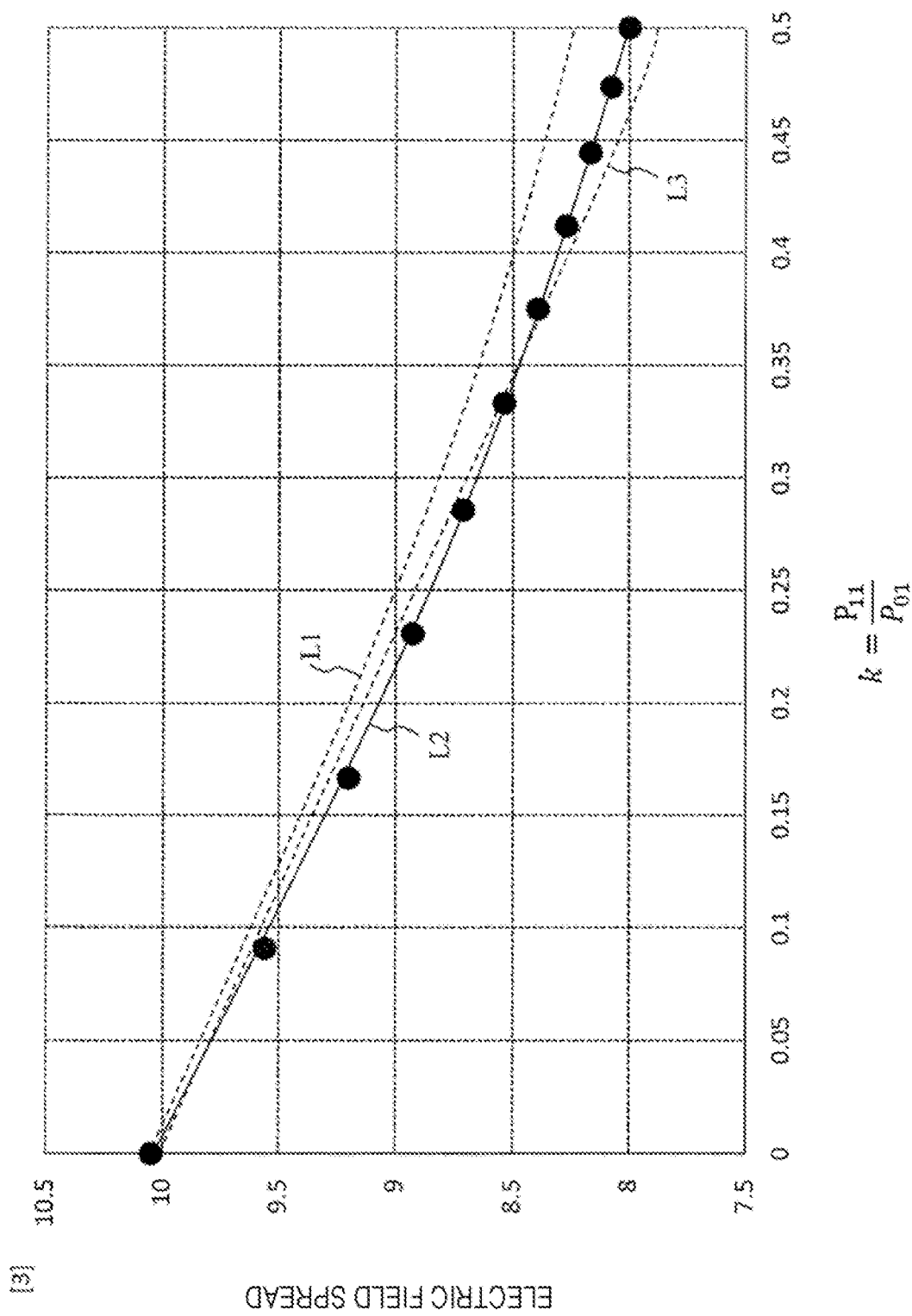
FIG. 3 is a diagram for explaining a relationship between light intensity ratio dependency of the electric field spread value and light intensity ratio dependency of an electric field spread calculated value acquired by the first mode field diameter measurement method according to the present invention. The horizontal axis represents a light intensity ratio k, and the vertical axis represents an electric field spread value.

The mode field diameter $w_{11}$ of the parameter is changed to find the mode field diameter $w_{11}$ of the LP11 mode in which the square error between the intensity ratio dependency of the electric field spread value and the intensity ratio dependency of the electric field spread calculated value is minimum. FIG. 3 is a graph for explaining the intensity ratio dependency (black circle) of the electric field spread value and the intensity ratio dependency (broken line L1, broken line L3, and solid line L2) of the electric field spread calculated value described in FIG. 2. In this step, of the intensity ratio dependency of the electric field spread calculated value in which the mode field diameter $w_{11}$ is changed, the solid line L2 represents the intensity ratio dependency of the electric field spread calculated value in which the square error from the intensity ratio dependency of the electric field spread value is minimum. Accordingly, the mode field diameter $w_{11}$ of the solid line L2 is the mode field diameter $w_{11}$ to be obtained by this method.

Figure 4:
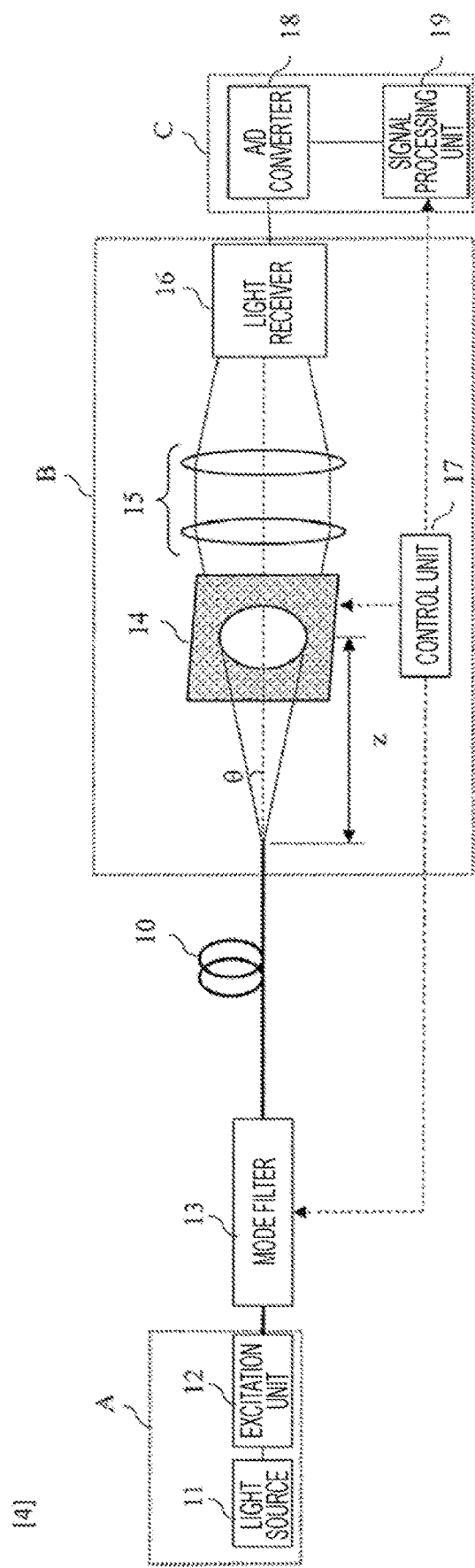
FIG. 4 is a diagram for explaining a mode field diameter measurement device according to the present invention.

FIG. 4 is a diagram for explaining a mode field diameter measurement device of the present embodiment. A mode field diameter measurement device includes:

an exciter A that excites an LP01 mode and an LP11 mode as test light to an optical fiber to be tested 10;

a light intensity measurement unit B that measures light intensity output from the optical fiber to be tested 10 while changing an aperture angle of a variable aperture;

a mode filter 13 that changes an intensity ratio k between the LP01 mode and the LP11 mode output from the optical fiber to be tested 10; and an arithmetic unit C to which the light intensity measured by the light intensity measurement unit B is input, in which the arithmetic unit C acquires an electric field spread value by using an integral value of a value related to the light intensity when the aperture angle is changed from zero to a maximum, acquires a plurality of the electric field spread value having different intensity ratios k of the LP01 mode and the LP11 mode output from the optical fiber to be tested 10 and acquires intensity ratio dependency of the electric field spread value, acquires an electric field spread calculated value which is calculated from a mode field diameter $w_{01}$, a wavelength of the test light, and the intensity ratio k and the electric field spread calculated value has a mode field diameter $w_{11}$ of the LP11 mode as a variable, by setting the electric field spread value in a case where light output from the optical fiber to be tested 10 is only the LP01 mode as the mode field diameter $w_{01}$ of the LP01 mode, and finds the mode field diameter $w_{11}$ of the LP11 mode in which a square error between intensity ratio dependency of the electric field spread value and intensity ratio dependency of the electric field spread calculated value with respect to the intensity ratio is minimum.

The exciter A includes a light source 11 and an excitation unit 12. The continuous light output from the light source 11 is excited as test light by the excitation unit 12 to the optical fiber to be tested 10 in the LP01 mode and the LP11 mode. The excitation unit 12 is, for example, a multimode fiber or an optical lens system. The exciter A performs step S11 described above.

The mode filter 13 has a function of removing unnecessary higher order modes and clad modes included in the test light propagating through the optical fiber to be tested 10 and a function of attenuating the light intensity of the LP11 mode. The mode filter 13 includes, for example, optical fiber bending with different radii.

The light intensity measurement unit B includes a variable aperture 14, an optical lens 15, a light receiver 16, and a control unit 17. The test light output from the optical fiber to be tested 10 passes through the variable aperture 14, then, collected by the optical lens 15, and photoelectrically converted by the light receiver 16. At this time, an aperture angle θ of the variable aperture can be changed according to a signal from the control unit 17. In order to align the center axis of the optical fiber to be tested 10 with the center of the variable aperture 14, it is desirable to install an alignment device (not illustrated) at the test light output end of the optical fiber to be tested 10. The light intensity measurement unit B performs the above-described step S12.

The arithmetic unit C includes an analog/digital (A/D) converter 18 and a signal processing unit 19. A signal related to light intensity output from the light receiver 16 is converted into digital data by the analog/digital (A/D) converter 18. The signal processing unit 19 acquires light intensity with respect to the aperture angle θ of the variable aperture 14 on the basis of a signal from the control unit 17 and digital data. The signal processing unit 19 further performs arithmetic processing (steps S13 and S14) of calculating the electric field spread value using the light intensity with respect to the aperture angle θ. Arithmetic processing (steps S15 and S16) of calculating the mode field diameters of the LP01 mode and the LP11 mode is performed using the change in the electric field spread value with respect to the ratio between the light intensities of the LP01 mode and the LP11 mode included in the test light.

The signal processing unit 19 can also be formed with a computer and a program, and the program can be recorded on a recording medium or be provided through a network.

Arithmetic processing (steps S15 and S16) of calculating the mode field diameter of the LP01 mode and the LP11 mode from the change in the electric field spread value with respect to the ratio of the light intensities of the LP01 mode and the LP11 mode will be described below.

An electric field spread value D(k) is calculated from the dependency of the light intensity passing through the variable aperture on the aperture angle θ and the following equation.

[Math. 2]

$$D(k) = \frac{\lambda}{\pi}\left[\frac{1}{2}\int_0^{\theta_{max}}\left(1 - \frac{P(\theta, k)}{P(\theta_{max}, k)}\right)\sin(2\theta)d\theta\right]^{-\frac{1}{2}} \quad (2)$$

In the equation, λ is the wavelength of the test light, D(k) is the electric field spread value, θ is the aperture angle of the variable aperture 14 from the central axis of the optical fiber to be tested 10, P(θ, k) is the light intensity when the aperture angle of the variable aperture 14 is θ, and $\theta_{max}$ is the maximum aperture angle. k is a ratio of the light intensity of the LP01 mode to the light intensity of the LP11 mode included in the test light.

Here, P(θ, k) can be expressed by the sum of the light intensity $P_{01}$(θ, k) of the LP01 mode component and the light intensity $P_{11}$(θ, k) of the LP11 mode component.

$$P(\theta,k)=P_{01}(\theta,k)+P_{11}(\theta,k) \quad \text{[Math. 3]}$$

When the light intensity of the LP11 mode component is removed to such an extent that k=0 can be regarded by the mode filter 13, Equation (2) becomes an equation representing the mode field diameter $w_{01}$ of the LP01 mode. Accordingly, the mode field diameter $w_{01}$ of the LP01 mode can be obtained, by measuring the light intensity at k≈0 by the light intensity measurement unit B (measuring the light intensity during conversion of the aperture angle θ from zero to $\theta_{max}$) and calculating the electric field spread value D(0) by the arithmetic unit C using Equation (2).

On the other hand, in a case where k≠0, the electric field spread value D(k) is an electric field spread value including information of both the LP01 mode and the LP11 mode as in Equation (3).

Here, the electric field distributions in the radial direction in the near field of the LP01 mode and the LP11 mode are approximated by Equations (4) and (5), respectively.

[Math. 4]

$$E_{n01} = \sqrt{\frac{2}{\pi w_{01}^2}}\exp\left(-\frac{r^2}{w_{01}^2}\right) \quad (4)$$

[Math. 5]

$$E_{n11} = \sqrt{\frac{8k}{\pi w_{11}^4}}\,r\cos\phi\exp\left(-\frac{r^2}{w_{11}^2}\right) \quad (5)$$

Here, $E_{n\nu\mu}$ represents the electric field distribution in the near field of the $LP_{\nu\mu}$ mode, $w_{\nu\mu}$ represents the mode field radius (spot size) of the $LP_{\nu\mu}$ mode, and r represents the radial coordinate in the optical fiber cross section. φ represents an azimuth angle in the cross section of the optical fiber.

At this time, the electric field distributions in the far field of the LP01 mode and the LP11 mode are expressed by Equations (6) and (7), respectively.

[Math. 6]

$$E_{f01} \propto \exp\left(-\frac{R^2}{W_{01}^2(z)}\right) \quad (6)$$

[Math. 7]

$$E_{f11} \propto \sqrt{\frac{8k}{\pi w_{11}^4}} R\cos\phi\exp\left(-\frac{R^2}{W_{11}^2(z)}\right) \quad (7)$$

Here, R represents a coordinate in the radial direction in the far-field. z represents a distance between the end face of the optical fiber to be tested 10 and the variable aperture 14. $W_{\nu\mu}(z)$ is a spot size at a point (far-field) away from the end face of the optical fiber to be tested 10 by a distance z, and is expressed by the following equation.

[Math. 8]

$$W_{\nu\mu}(z) = w_{\nu\mu}\sqrt{1 + \left(\frac{\lambda z}{\pi w_{\nu\mu}^2}\right)^2} \quad (8)$$

At this time, the light intensity passing through the variable aperture 14 having the aperture angle α can be expressed by the following equation.

[Math. 9]

$$P(\alpha,k)=\int_0^{2\pi}\int_0^{\alpha}(E_{f01}+E_{f11})RdRd\phi \quad (9)$$

The spot size $w_{11}$ in which a square error between an electric field spread calculated value $D_{calc}(k)$, obtained by substituting the test wavelength, the measured mode field diameter of the LP01 mode, and k in a set of simultaneous equations (2) and (6) to (9), and a measured electric field spread value $D_{measure}(k)$ is minimum is found, and the $w_{11}$ is set to the mode field diameter of the LP11 mode.

The electric field spread calculated value $D_{calc}(k)$ is calculated as follows.

First, in the LP01 mode, $W_{01}(z)$ is calculated by substituting the value of D(0) obtained by calculating Equation (2) with k=0 into $w_{\nu\mu}$ of Equation (8). For the LP11, z and $w_{11}$ are set as parameters and $W_{11}(z)$ is set.

$W_{01}(z)$ and $W_{11}(z)$ obtained here are substituted into equations (6) and (7), respectively, to obtain electric field distributions $E_{f01}$ and $E_{f11}$ in the far field.

Electric field distributions $E_{f01}$ and $E_{f11}$ are substituted into Equation (9), an integral value of α(=0) from zero to $\theta_{max}$ is obtained, and calculated values of light intensities $P(\theta, k)$ and $P(\theta_{max}, k)$ are obtained.

By substituting this calculated value into Equation (2), an electric field spread calculated value $D_{calc}(k)$ can be obtained.

Second Embodiment

Figure 5:
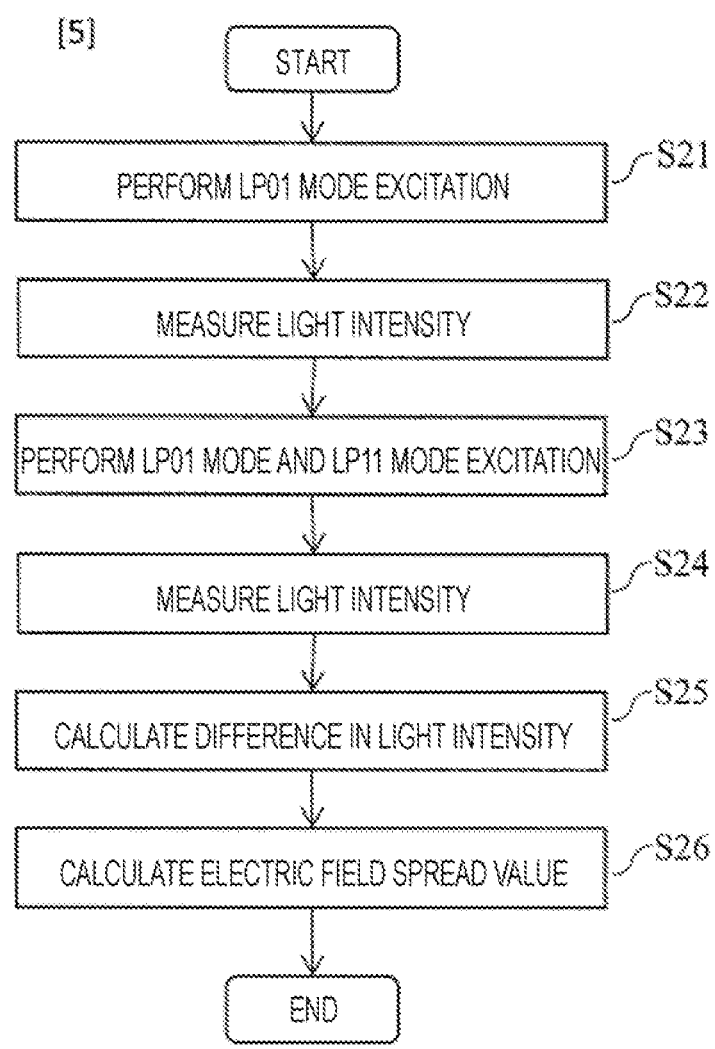
FIG. 5 is a diagram for explaining a second mode field diameter measurement method according to the present invention.

FIG. 5 is a process diagram for explaining a second mode field diameter measurement method.

This mode field diameter measurement method is also a mode field diameter measurement method for measuring a mode field diameter of an optical fiber to be tested, which is capable of propagating LP01 mode and LP11 mode, by a variable aperture (VA) method.

The configuration of the mode field diameter measurement device that implements the second mode field diameter measurement method is the same as the configuration of the mode field diameter measurement device described with reference to FIG. 4.

This mode field diameter measurement method includes:
exciting an LP01 mode as test light to an optical fiber to be tested (step S21);
measuring light intensity of only the LP01 mode output from the optical fiber to be tested while changing an aperture angle of a variable aperture (step S22);
exciting the LP01 mode and an LP11 mode as test light to the optical fiber to be tested (step S23);
measuring light intensity in which the LP01 mode and the LP11 mode output from the optical fiber to be tested are mixed while changing the aperture angle of the variable aperture (step S24);
subtracting the light intensity of only the LP01 mode from the light intensity in which the LP01 mode and the LP11 mode are mixed for each of the aperture angle, and calculating light intensity of the LP11 mode for each of the aperture angle (step S25); and
acquiring an electric field spread value by using an integral value of a value related to the light intensity of the LP11 mode when the aperture angle is changed from zero to a maximum, and setting the electric field spread value as a mode field diameter of the LP11 mode (step S26).

Figure 6:
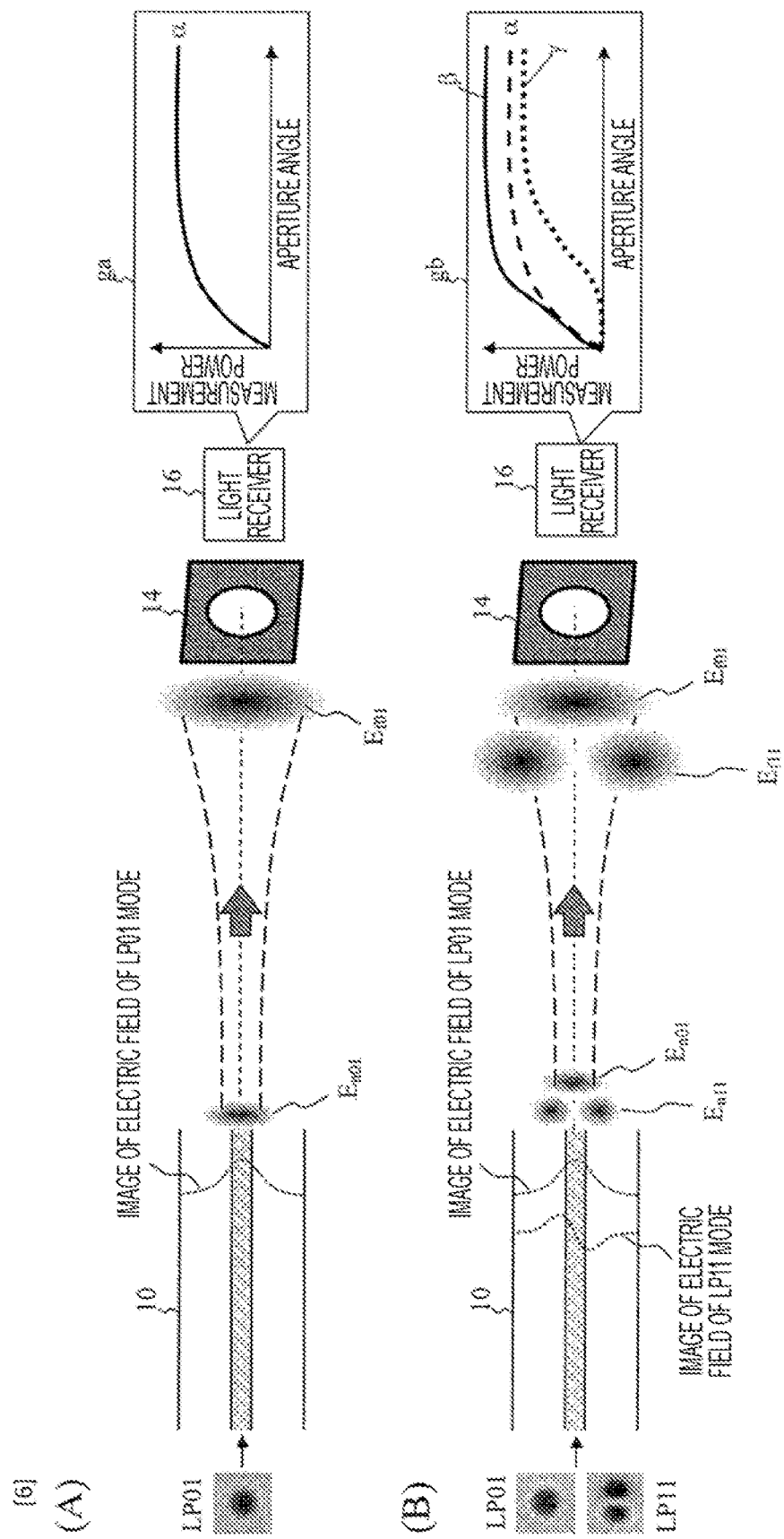
FIG. 6 is a diagram for explaining the second mode field diameter measurement method according to the present invention.

FIG. 6 is an image diagram for explaining the measurement method of the present embodiment.

Details will be described below.

FIG. 6(A) is an image of steps S21 and S22.

Step S21

This step is a test light excitation procedure of exciting the LP01 mode to the optical fiber to be tested 10. For example, the mode filter 13 is used to remove a higher order mode or a clad mode other than the LP01 mode.

Step S22

This step is a light intensity measurement procedure of measuring, by the light receiver 16, light intensity of output light (LP01 mode) from the other end passing through an aperture 14 whose center is installed on the central axis of the other end of the optical fiber to be tested 10, during a change in an aperture angle θ with respect to a central axis of the other end of the aperture 14. As the light intensity with respect to the aperture angle θ, for example, a curve α such as a graph ga is obtained.

FIG. 6(B) is an image of steps S23 and S24.

Step S23

This step is a test light excitation procedure of exciting the LP01 mode and the LP11 mode to the optical fiber to be tested 10. For example, the mode filter 13 is used to remove a higher order mode or a clad mode other than the LP01 mode and the LP11 mode.

Step S24

This step is a light intensity measurement procedure of measuring, by the light receiver 16, light intensity of output light (LP01 mode and LP11 mode are mixed) from the other end passing through an aperture 14 whose center is installed on the central axis of the other end of the optical fiber to be tested 10, during a change in an aperture angle θ with respect to a central axis of the other end of the aperture 14. As the light intensity with respect to the aperture angle θ, for example, a curve β such as a graph gb is obtained.

Step S25

The curve β obtained in step S24 is obtained by adding the aperture angle dependency (curve α) of the light intensity of the LP01 mode and the aperture angle dependency (curve γ) of the light intensity of the LP11 mode. Therefore, in this step, the curve α is subtracted from the curve β to calculate the aperture angle dependency (curve γ) of the light intensity of the LP11 mode.

Step S26

In this step, the electric field spread value for calculating the electric field spread value is calculated using the aperture angle dependency (curve γ) of the light intensity of the LP11 mode calculated in step S25 and the above-described Equation (1). Since the curve γ calculated in step S25 is the light intensity of only the LP11 mode, the electric field spread value calculated in this step is the mode field diameter $w_{11}$ of the LP11 mode.

Advantageous Effects of Invention

The mode field diameter measurement method described in the first and second embodiments can measure a mode field diameter in an optical fiber, which is capable of propagating a fundamental mode (LP01 mode) and a first higher order mode (LP11 mode), without using a mode multiplexer.

REFERENCE SIGNS LIST

10 Optical fiber to be tested
11 Light source
12 Excitation unit
13 Mode filter
14 Variable aperture
15 Optical lens
16 Light receiver
17 Control unit
18 A/D converter
19 Signal processing unit

The invention claimed is:

1. A mode field diameter measurement method comprising:
    exciting an LP01 mode and an LP11 mode as test light to an optical fiber to be tested;
    measuring light intensity output from the optical fiber to be tested while changing an aperture angle of a variable aperture;
    acquiring an electric field spread value by using an integral value of a value related to the light intensity when the aperture angle is changed from zero to a maximum;
    changing an intensity ratio between the LP01 mode and the LP11 mode output from the optical fiber to be tested and acquiring a plurality of the electric field spread value to acquire a relationship between the electric field spread value and the intensity ratio;
    acquiring intensity ratio dependency of an electric field spread calculated value calculated from a mode field diameter of the LP01 mode, a wavelength of the test light, and the intensity ratio and the electric field spread calculated value has a mode field diameter of the LP11 mode as a variable, by setting the electric field spread value in a case where light output from the optical fiber to be tested is only the LP01 mode as the mode field diameter of the LP01 mode; and
    finding the mode field diameter of the LP11 mode in which a square error between intensity ratio dependency of the electric field spread value and the intensity ratio dependency of the electric field spread calculated value is minimum.

2. A mode field diameter measurement device comprising:
    an exciter that excites an LP01 mode and an LP11 mode as test light to an optical fiber to be tested;
    a light intensity measurement unit that measures light intensity output from the optical fiber to be tested while changing an aperture angle of a variable aperture;
    a mode filter that changes an intensity ratio between the LP01 mode and the LP11 mode output from the optical fiber to be tested; and
    an arithmetic unit to which the light intensity measured by the light intensity measurement unit is input,
    in which the arithmetic unit
    acquires an electric field spread value by using an integral value of a value related to the light intensity when the aperture angle is changed from zero to a maximum,
    acquires a plurality of the electric field spread value having different intensity ratios of the LP01 mode and the LP11 mode output from the optical fiber to be tested and acquires intensity ratio dependency of the electric field spread value,
    acquires an electric field spread calculated value which is calculated from a mode field diameter of the LP01 mode, a wavelength of the test light, and the intensity ratio and the electric field spread calculated value has a mode field diameter of the LP11 mode as a variable, by setting the electric field spread value in a case where light output from the optical fiber to be tested is only the LP01 mode as the mode field diameter of the LP01 mode, and
    finds the mode field diameter of the LP11 mode in which a square error between the intensity ratio dependency of the electric field spread value and intensity ratio dependency of the electric field spread calculated value with respect to the intensity ratio is minimum.

* * * * *